(12) United States Patent
Eichner et al.

(10) Patent No.: US 11,828,340 B2
(45) Date of Patent: Nov. 28, 2023

(54) DEVICE AND FRICTION BRAKE FOR REDUCING THE AMOUNT OF FINE DUST

(71) Applicant: Bayerische Motoren Werke Aktiengesellschaft, Munich (DE)

(72) Inventors: Georg Eichner, Ismaning (DE); Bernhard Kohl, Munich (DE); Katharina Kolbeck, Munich (DE); Rasmus Leicht, Eching (DE); Diana Westerteicher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 323 days.

(21) Appl. No.: 17/058,580

(22) PCT Filed: May 21, 2019

(86) PCT No.: PCT/EP2019/063062
§ 371 (c)(1),
(2) Date: Nov. 24, 2020

(87) PCT Pub. No.: WO2019/228854
PCT Pub. Date: Dec. 5, 2019

(65) Prior Publication Data
US 2021/0190156 A1     Jun. 24, 2021

(30) Foreign Application Priority Data
May 30, 2018 (DE) .................... 10 2018 208 631.1

(51) Int. Cl.
*F16D 65/00* (2006.01)
*F16D 55/22* (2006.01)
*F16D 55/00* (2006.01)

(52) U.S. Cl.
CPC ......... *F16D 65/0031* (2013.01); *F16D 55/22* (2013.01); *F16D 2055/0016* (2013.01)

(58) Field of Classification Search
CPC ......... F16D 65/0031; F16D 2055/0016; F16D 55/22
See application file for complete search history.

(56) References Cited

U.S. PATENT DOCUMENTS 10,605,316 B2 * 3/2020 Kunzler ................. B60T 1/065
2006/0230729 A1 10/2006 Tabrizi et al.
(Continued)

FOREIGN PATENT DOCUMENTS

CN          1767964 A      5/2006
CN        103119317 A      5/2013
(Continued)

OTHER PUBLICATIONS

Chinese Office Action issued in Chinese application No. 201980032129.1 dated Oct. 11, 2021, with English translation (Eighteen (18) pages).
(Continued)

*Primary Examiner* — Pamela Rodriguez
(74) *Attorney, Agent, or Firm* — Crowell & Moring LLP

(57) ABSTRACT

A device of a friction brake includes a collection container. Brake particles in an airflow coming from the friction brake are filterable by the device and the brake particles are collectable in the collection container. Collected brake particles are processable by the device such that an amount of respirable brake particles in the collected brake particles is reduced.

3 Claims, 2 Drawing Sheets

(56) References Cited

U.S. PATENT DOCUMENTS

2007/0000740 A1* 1/2007 Raab .................. F16D 65/0031
                                                                                              188/218 A
2012/0067206 A1     3/2012 Lupica et al.

FOREIGN PATENT DOCUMENTS

| CN | 104769309 A | 7/2015 |
|---|---|---|
| CN | 205841577 U | 12/2016 |
| CN | 205951955 U | 2/2017 |
| CN | 205988651 U | 3/2017 |
| DE | 20 2006 016 661 U1 | 4/2008 |
| EP | 1 837 066 A2 | 9/2007 |
| KR | 10-2004-0033884 A | 4/2004 |
| WO | WO 2011/124312 A2 | 10/2011 |

OTHER PUBLICATIONS

PCT/EP2019/063062, International Search Report dated Sep. 6, 2019 (Two (2) pages).

German Search Report issued in German application No. 10 2018 208 631.1 dated Apr. 28, 2021, with Statement of Relevancy (Seven (7) pages).

* cited by examiner

DEVICE AND FRICTION BRAKE FOR REDUCING THE AMOUNT OF FINE DUST

BACKGROUND AND SUMMARY OF THE INVENTION

The invention relates to a device for reducing the amount of fine dust emitted by a friction brake of a vehicle. The invention further relates to a friction brake having reduced fine dust emission.

A vehicle, in particular a road vehicle, typically comprises one or more friction brakes, the vehicle being able to be decelerated thereby. A friction brake in this case has a brake caliper which is designed to press brake pads against a brake disk so that a deceleration of the vehicle is effected by the friction between the brake pads and the brake disk.

Typically, brake particles are produced during the frictional contact between the brake pads and brake disk, these brake particles being able to enter the surrounding air of a friction brake and thus, depending on the particle size, being able to contribute to the fine dust emission of a vehicle.

The present document relates to the technical object of reducing the fine dust emission caused by the friction brakes of a vehicle in an efficient and reliable manner.

The object is achieved by the independent claims. Advantageous embodiments are disclosed, amongst other things, in the dependent claims. It should be mentioned that additional features of a claim which is dependent on an independent claim, without the features of the independent claim or only in combination with some of the features of the independent claim, may form a separate invention which is independent of the combination of all of the features of the independent claim and which may form the subject matter of an independent claim, a divisional application or a subsequent application. This applies equally to the technical teaching which is disclosed in the description and which may form an invention independent of the features of the independent claims.

According to one feature, a device, in particular a filter device for a friction brake, is disclosed. The device comprises a collection container (for example a filter chamber or a collection container arranged downstream of a filter). The collection container is designed to receive and/or to collect brake particles which are produced during the operation of the friction brake.

The device is designed to filter brake particles from an airflow coming from the friction brake and to collect these brake particles in the collection container. In other words, brake particles produced during braking may be collected in the collection container. In this case, in particular, respirable brake particles may be collected in the collection container.

The device is designed to process brake particles collected in the collection container such that the amount and/or the proportion of respirable brake particles in the collected brake particles is reduced. In particular, the collected brake particles may be reprocessed in order to make the respirable brake particles non-respirable. Thus, the fine dust emission of a friction brake may be reduced in a reliable manner.

The device may be designed to mix the collected brake particles with a liquid and/or with a binding agent in order to reduce the amount of respirable brake particles and/or to make the respirable brake particles non-respirable.

Alternatively or additionally, the device may be designed to subject the collected brake particles to a pressure and/or to press the collected brake particles in order to reduce the amount of respirable brake particles and/or to make the respirable brake particles non-respirable. In particular, the collected brake particles may be compressed at least partially to form a clump and/or briquette. Thus, the fine dust emission of a friction brake may be reduced in a particularly efficient and reliable manner.

Moreover, a friction brake which comprises the device described in this document for reducing fine dust is disclosed.

According to a further feature, a friction brake is disclosed, wherein the friction brake comprises a brake disk and a brake caliper which at least partially surrounds the brake disk and which has at least one brake pad. The brake disk and the brake pad are designed such that during frictional contact between brake disk and brake pad substantially no respirable brake particles are emitted by the brake disk and/or by the brake pad. Thus, a friction brake may be provided in which the emission of fine dust may be avoided directly at the source.

The brake disk and the brake pad may be designed such that during frictional contact substantially no respirable brake particles and/or substantially only non-respirable brake particles are generated. In particular, to this end the brake disk and the brake pad may be adapted to one another such that by the specific combination of brake disk and brake pad it is effected that substantially no respirable brake particles and/or substantially only non-respirable brake particles are generated.

Alternatively or additionally, the brake disk and the brake pad may comprise a material by which a clumping (in particular in the case of solid bodies) and/or an agglomeration (in particular in the case of gases) of respirable brake particles is effected. By the clumping and/or agglomeration of respirable brake particles, non-respirable brake particles may be generated from the respirable brake particles.

According to a further feature, a road vehicle (in particular a passenger motor vehicle or a truck or a bus or a motorcycle) which comprises the friction brake and/or device described in this document is disclosed.

It should be mentioned that the devices and systems described in this document may be used both individually and in combination with other devices and systems described in this document. Moreover, any features of the devices and systems described in this document may be combined together in many different ways. In particular, the features of the claims may be combined together in many different ways.

The invention is described hereinafter in more detail with reference to exemplary embodiments.

DETAILED DESCRIPTION OF THE DRAWINGS

Figure 1A:
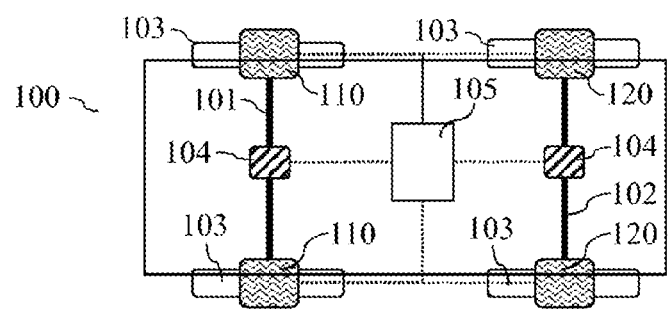
FIG. 1a shows an exemplary vehicle with a plurality of friction brakes.

As set forth above, the present document relates to the efficient reduction of the amount of fine dust which is emitted by the one or more friction brakes of a vehicle. In this connection FIG. 1a shows a vehicle 100 with a front axle 101 and a rear axle 102, wherein the axles 101, 102 in each case have two wheels 103, in each case with a friction brake 110, 120. By means of a friction brake 110, 120 it is possible to produce a braking torque on a wheel 103 of the vehicle 100 and thus a deceleration of the vehicle 100. The friction brakes 110, 120 of the vehicle 100 may be mechanically actuated (in particular hydraulically) and/or electrically by actuating a brake pedal and/or a brake lever of the vehicle 100. In FIG. 1a by way of example a control unit 105 is shown for activating the friction brakes 110, 120.

Figure 1B:
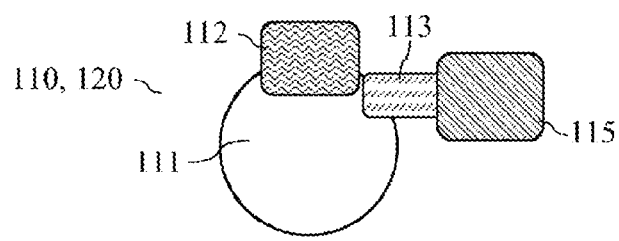
FIG. 1b shows an exemplary friction brake with a filter device.

FIG. 1b shows an exemplary construction of a friction brake 110, 120. The friction brake 110, 120 comprises a brake disk 111 and a brake caliper 112. In this case, the brake caliper 112 is configured to press brake pads from both sides against the brake disk 111 in order to effect a braking torque on the brake disk 111 and the wheel 103 connected thereto. If the brake pads are pressed against the brake disk 111, typically wear of the brake pads and the disk occurs in the form of more or less large brake particles.

In order to avoid that, in particular, relatively small respirable brake particles enter the environment and thus lead to a fine dust emission of a vehicle 100, a friction brake 110 may have a filter device 115 which is designed to separate accumulating brake dust and/or accumulating brake particles. In this case, the brake particles may be suctioned via a suction duct 113 away from the brake caliper 112 and/or the brake disk 111 to the filter device 115. Alternatively or additionally, the filter device 115 may at least partially enclose the brake disk 111 and/or the brake caliper 112.

Figure 2A:
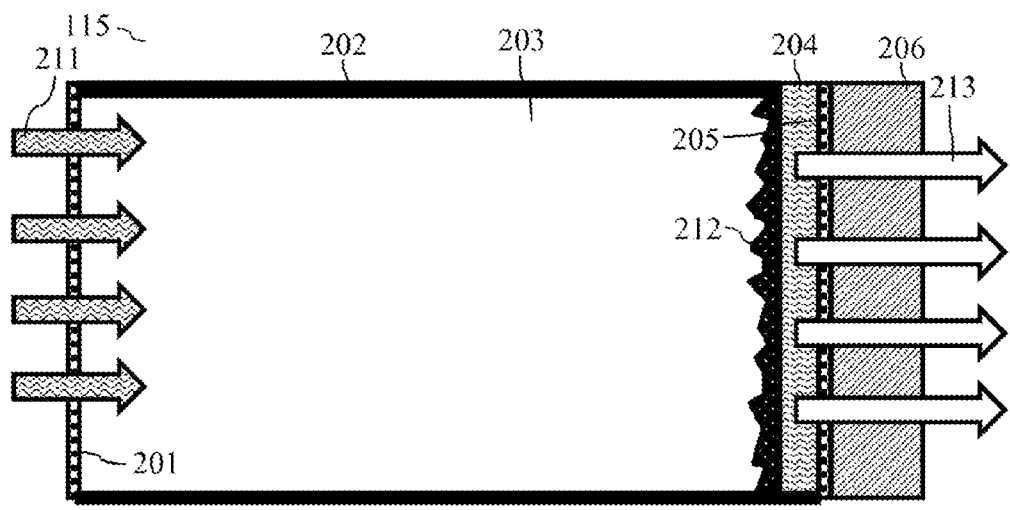
FIG. 2a shows an exemplary filter device in an operating state and/or in an operating mode.

FIG. 2a shows an exemplary filter device 115 with a (fine dust) filter 204. An airflow 211, which is configured to suction brake particles generated by a friction brake 110 into the filter device 115, may be produced by a negative pressure means 206 (for example by a turbine). In particular, the airflow 211 may be suctioned through a closable front wall 201 into the filter device 115. The closable front wall 201 may be configured to permit an airflow 211 from the outside into the filter device 115 (shown in FIG. 2a by the arrows). On the other hand, the closable front wall 201 may be configured to prevent an airflow 211 in the opposing direction (out of the filter device 115). For example, to this end the front wall 201 may be configured as a check valve.

The airflow 211 produced by the negative pressure means 206 may be suctioned through the filter 204 so that brake particles 212 are separated on the surface of the filter 204. The filtered airflow 213 exiting from the filter device 115 thus has a reduced amount of brake particles 213 relative to the airflow 211. The filtered-out brake particles 212 may be collected in a filter chamber 203 (also denoted as a collection container in this document) formed by the front wall 211, by a side wall 202 and by the filter 204.

The filter device 115 may also have a closable rear wall 205. The closable rear wall 205 may be configured to permit an airflow 213 from the filter device 115 (shown in FIG. 2a by the arrows). On the other hand, the closable rear wall 205 may be configured to prevent an airflow 213 in the opposing direction (into the filter device 115). For example, to this end the rear wall 205 may be configured as a check valve.

FIG. 2a shows the filter device 115 in an operating state and/or in an operating mode in which an airflow 211 from a friction brake 110 is suctioned through the filter device 115 in order to filter out brake particles 212 from the airflow 211. In the operating state, both the front wall 201 and the rear wall 205 are opened in order to permit the airflow 211 through the filter 204.

During the course of operation, more and more brake particles 212 are deposited on the surface of the filter 204, whereby the effectiveness of the filter 204 is gradually reduced. Alternatively or additionally, the pressure in the filter device 115 may rise which may lead to problems during operation of the filter device 115. In order to increase the efficiency of the filter 204 and/or to avoid pressure problems, the brake particles 212 may be removed from the surface of the filter 204 and/or from the filter chamber 203.

Figure 2B:
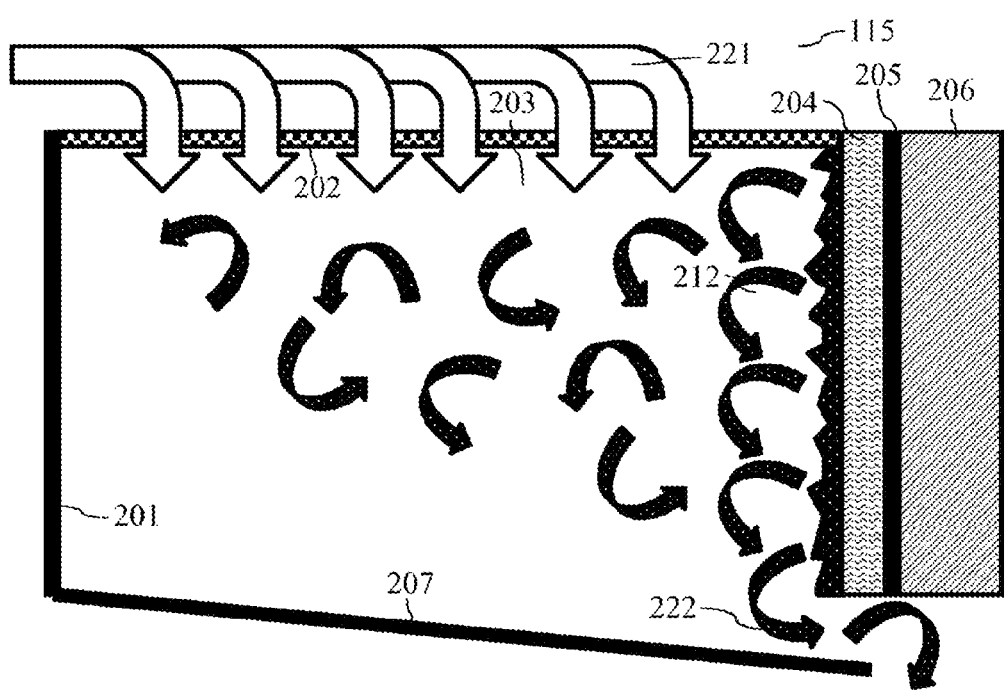
FIG. 2b shows an exemplary filter device in a regenerating state and/or in a regenerating mode.

FIG. 2b shows the filter device 115 in a regenerating state and/or regenerating mode which enables it to remove brake particles 212 from the filter chamber 203. To this end, the front wall 201 and the rear wall 205 may be closed. Moreover, the one or more side walls 202 may be opened in order to conduct a purging stream 221 (for example consisting of a liquid or gaseous purging medium) through the filter chamber 203. For example, a first side wall 202 (for example the side wall shown at the top in FIG. 2b) may be configured as a shut-off valve which may be opened for regenerating the filter device 115. A second side wall 202 (for example the side wall shown at the bottom in FIG. 2b) may be configured as a shut-off valve and/or flap 207 which may be opened for regenerating the filter device 115.

As shown in FIG. 2b, the purging stream 221 may be configured to release and/or entrain the brake particles 212 so that a purging stream 222 enriched with brake particles 212 is guided out of the filter chamber 203. Thus a regenerating and/or cleaning of the filter 204 may be effected by means of the purging.

During the regenerating and/or cleaning of the filter 204 brake particles 212 and, in particular, relatively small respirable brake particles 212 and thus fine dust may enter the surroundings of the vehicle 100.

The filter device 115 may be designed to convert respirable brake dust into a non-respirable form. To this end, it is possible to bind and/or convert the brake dust. After the binding and/or conversion of the fine dust, the brake dust may be separated off, i.e., removed and/or purged out of the collection container 203.

As shown in FIGS. 2a and 2b, the brake dust may be collected in a filter container and/or collection container 203. A conversion and/or binding of the collected dust may take place. The conversion and/or binding of the collected brake dust may take place in various ways. In one embodiment, a liquid which transfers the collected fine dust into a non-respirable form may be used. In a further embodiment, the collected brake dust may be shaped so that the brake dust is no longer respirable. For example the collected brake dust may be compressed under pressure such that a type of briquette of brake dust is produced.

The bound and/or converted brake dust may thus be separated off. By emptying the collection container 203, the required size of collection container 203 for storing the brake particles 212 may be reduced. Moreover, by the conversion and/or binding of brake dust, the amount of fine dust emitted may be significantly reduced. Moreover, the maintenance effort may be reduced.

As already set forth above, brake dust is produced by wear on the brake disk 111 and a brake pad of the brake caliper 112 during the course of braking. In this case, typically a substantial proportion of the brake dust consists of fine dust.

The brake disk 111 and the brake pad may be adapted to one another and/or selected such that during braking a reduced amount of fine dust is emitted. In other words, the brake disk 111 and the brake pad may be selected and/or coated (in particular the material of a brake pad and/or the alloy of a brake disk 111 may be selected) such that during the frictional contact process for achieving the braking action principally coarse brake dust is emitted (and potentially no fine dust).

Alternatively or additionally, the surface coating and/or the basic material of the brake pad and/or brake disk 111 may have a material which leads to clumping of the abraded fine dust. In this case, the smallest particles 212 are bound into larger particles by a means located in the brake pad and/or the brake disk 111 so that fine dust may be avoided. Preferably, the clumping of the particles 212 is embodied such that the resulting larger particles drop to the ground and thus may not be breathed in by a person.

By the use of adapted materials and/or binding agents the fine dust emission of a friction brake 110 may be directly reduced at source. Thus, the installation of a suction device 113 and filter device 115 may be dispensed with.

The present invention is not limited to the exemplary embodiments shown. In particular, it should be noted that the description and the Figures are only intended to illustrate the principle of the proposed method, devices and systems.

What is claimed is:

1. A device of a friction brake, comprising:
a collection container;
wherein brake particles in an airflow coming from the friction brake are filterable by the device and wherein the brake particles are collectable in the collection container;
wherein a liquid or a gaseous purging stream is conductable through the collection container such that the liquid or the gaseous purging stream is enrichable with the brake particles and is guidable out of the collection container;
wherein respirable brake particles are mixable with a binding agent by the device to form the respirable brake particles into non-respirable brake particles in order to reduce an amount of the respirable brake particles.

2. A friction brake, comprising:
a brake disk; and
a brake caliper which at least partially surrounds the brake disk and which has a brake pad;
wherein the brake disk and the brake pad are configured such that, during frictional contact between the brake disk and the brake pad, substantially no respirable brake particles and/or substantially only non-respirable brake particles are emitted by the brake disk and/or by the brake pad;
wherein the brake disk and/or the brake pad comprise and/or contain a material by which a clumping of respirable brake particles is effected in order to generate non-respirable brake particles from respirable brake particles and wherein the clumped non-respirable brake particles drop from the friction brake to a ground surface.

3. A vehicle, comprising:
the friction brake according to claim 2; or
the device according to claim 1.

* * * * *